United States Patent [19]
Hegedus et al.

[11] Patent Number: 5,130,361
[45] Date of Patent: Jul. 14, 1992

[54] EPOXY SELF-PRIMING TOPCOAT

[75] Inventors: Charles R. Hegedus, Warrington, Pa.;
Donald J. Hirst, Mt. Laurel, N.J.;
Anthony T. Eng, Philadelphia, Pa.

[73] Assignee: The United States of America as represented by the Secretary of the Navy, Washington, D.C.

[21] Appl. No.: 739,921

[22] Filed: Aug. 2, 1991

Related U.S. Application Data

[63] Continuation-in-part of Ser. No. 701,406, May 13, 1991.

[51] Int. Cl.$^5$ ............................................. C08L 75/04
[52] U.S. Cl. ............................ 524/204; 524/396; 524/404; 524/405; 524/417
[58] Field of Search ................ 524/204, 396, 404, 405, 524/417

[56] References Cited

U.S. PATENT DOCUMENTS 4,885,324 12/1989 Hegedus et al. ................ 524/204
5,043,373 8/1991 Hegedus et al. ................ 524/204

*Primary Examiner*—Maurice J. Welsh
*Attorney, Agent, or Firm*—James V. Tura; James B. Bechtel; Susan E. Verona

[57] ABSTRACT

A corrosion-resistant coating which can be applied directly to a surface as a self-priming topcoat comprising from about 10 to 90 percent by weight of an epoxy binder and 5 to 65 percent by weight of a combination of metal salts or pigments which consist essentially of calcium borosilicate, zinc salts of benzoic acids, and an alkaline earth metal phosphate such as zinc-barium phosphate. In addition, the coating may contain up to about 30 percent by weight of a titanium dioxide pigment and up to about 75 percent by weight of at least one organic solvent.

10 Claims, No Drawings

EPOXY SELF-PRIMING TOPCOAT

STATEMENT OF GOVERNMENT INTEREST

The invention described herein may be manufactured and used by or for the Government of the United States of America for governmental purposes without the payment of any royalties thereon or therefor.

CONTINUATION APPLICATIONS

This application is a continuation-in-part of copending application Ser. No. 07/701,406 filed May 13, 1991.

BACKGROUND OF THE INVENTION

This invention relates to novel coating compositions and more specifically to corrosion-resisting coatings which can be applied directly to various substrates particularly metal either as a high or low gloss, self-priming topcoat.

Various surfaces and particularly metal surfaces or substrates require the protection of a coating especially when the surfaces are exposed to a corrosive environment. Metal surfaces of aircraft, for example, are exposed to seawater spray which require protection from corrosion. Specifically, aircraft, e.g., Navy aircraft, are exposed to seawater spray in addition to various acid-forming gases such as sulfur dioxide, carbon dioxide, etc. Moreover, various machinery and equipment in the industrial environments, where fossil fuels are used, need protection against corrosion. In addition, it is important that the coatings be resistant to various chemicals and the weather and also be flexible and have good adhesion characteristics.

Presently, coating systems comprise one or more films, i.e., an undercoat or sealant and a topcoat. Aircraft, for example, traditionally have been coated with high performance protective films generally consisting of an epoxy primer and a polyurethane topcoat. The epoxy primers used on the aircraft are designed to adhere to the metal surface to improve the adhesion of the topcoat and inhibit corrosion. The coating compositions of this invention provides adhesion and corrosion resistance, and also has the required degree of flexibility, the desired optical properties, and a substantial resistance to weather and various chemicals. Moreover, the multi-film coatings generally have a total dry film thickness ranging up to about 0.005 inches, e.g., up to about 10 mils or more which adds considerable weight to the aircraft. Further, it is time consuming to apply multi-coats particularly since there is a drying time between each application. In addition, the removal of a multi-coat system also can be difficult and time consuming and generate high levels of volatile organic (VOC) emissions during the coating operations.

In accordance with this invention, however, the corrosion resistant coating consisting of a single coat comprising an epoxy binder e.g. an epoxy resin such as a bisphenol-A epichlorohydrin condensation product having molecular weights ranging up to about 300,000 or higher in combination with a unique mixture of corrosion-inhibiting metal salts or pigments consisting essentially of an alkaline earth metal or zinc phosphate e.g. zinc-barium phosphate, zinc salts of a benzoic acid or a substituted benzoic acid, and calcium borosilicate. All three of these salts or pigments are essential, in the stated proportions, to provide a high gloss film with the necessary corrosion resistance, and adhesion required of a good coating.

Other pigments and particularly titanium dioxide ($TiO_2$) including spherical $TiO_2$ particles e.g. vesiculated beads may be included as a pigment together with the above mentioned pigments. The coating compositions of this invention may be applied, as one coat, directly to various hard surfaces such as metal or organic matrix composites etc. and does not require a topcoat or an undercoat to provide a corrosion-resistant finish with the desired optical properties.

SUMMARY OF THE INVENTION

A corrosion-resistant coating which can be applied directly to a surface as a self-priming topcoat which comprises about 10 to 90 percent by weight of an epoxy binder and 5 to 65 percent by weight of a combination of corrosion-resistant pigments consisting essentially of calcium borosilicate, a zinc salt of a benzoic acid, and an alkaline earth metal or a zinc phosphate such as a zinc-barium phosphate.

Accordingly, it is the object of this invention to provide a corrosion resistant coating which can be applied directly to a surface e.g., metal, as a single coat.

It is another object of this invention to provide a coating which is flexible, resistant to chemicals, and weathering, and also will adhere to the substrate.

It is still a further object of this invention to provide a coating for use on military or civilian aircraft of reduced thickness to reduce the weight while at the same time providing the necessary corrosion resistance.

These and other objects of the invention are accomplished, in accordance with this invention, by providing a corrosion-resistant composition capable of being applied as a single topcoat having corrosion resistance properties.

THE PREFERRED EMBODIMENTS

This invention is directed to corrosion resistant coatings which functions as a primer and as a topcoat. The coating has good adhesion characteristics, is highly flexible and resistant to chemical and extreme weather conditions.

More specifically, this invention relates to a corrosion-resistant coating which comprises from about 10 to 90 percent e.g. 30 to 60 percent by weight of the total coating of an epoxy resin and about 5.0 to 65 percent by weight of the total coating of a combination of pigments or metal salts. The combination of pigments consist essentially of from about 15 to 35 percent e.g. 20 to 30 percent by weight of an alkaline earth metal or zinc phosphate e.g. zinc-barium phosphate, 1 to 5 percent e.g. 2 to 4 percent by weight of a zinc salt of a benzoic acid or a substituted benzoic acid, and about 5 to 35 percent e.g. 10 to 30 percent by weight of calcium borosilicate. In addition, depending on the opacity required of the coating, etc. from 0 to 30 percent e.g. from 1 to 20 percent by weight of titanium dioxide pigment based on the total weight of the coating may be added as an additional pigment. Generally, the coating is applied as a solution and therefore may contain from about 0 to 75 percent, e.g. from 5 to 75 percent or 5 to 50 percent by weight of the total coating of at least one organic solvent e.g. Mil-T-81772 including various mixtures of solvents such as paint solvents.

The combination of metal salts or pigments is unique and consists essentially of an alkaline earth metal phosphate e.g. zinc phosphate or zinc-barium phosphate etc., zinc salts of benzoic acid or a substituted benzoic acid and calcium borosilicate in specific ratios. These three metal salts or pigments alone or in combination with other pigments e.g. TiO$_2$ provide outstanding corrosion protection, which enables the coating to be used as a self-priming high-gloss or low-gloss topcoat. The preferred zinc salts of the benzoic acid have at least one hydroxyl substituent and one (NO$_2$) group. The zinc salts of the benzoic acids are further characterized as having molecular weights of approximately 100 to 500 and a density of about 2-3 grams per milliliter. The preferred zinc phosphates i.e. zinc-barium phosphate are available as Phos-Plus (J0866) from Mineral Pigments Corporation. The calcium borosilicates are available from Halox Pigments as CW-291.

In addition to utilizing the combination of pigments in the required ratios, other known pigments particularly titanium dioxide may be added to the binder to provide reinforcing strength and also to add color, hiding and opacity to the coating. Additives that maybe used include tinting or coloring agents which may be added to the coating in small but effective amounts including zinc oxide, antimony oxides, barium sulfate, calcium carbonate and one or more of the organic pigments such as the phthalocyanine colors e.g. greens or blues, etc.

Specifically, the corrosion resistant coatings of this invention can be prepared by combining ingredients 1 through 9 and then milling to a Hegman grind (ASTM-D-1210) $\geq 5$ for camouflage or $\geq 7$ for high gloss colors. Mix ingredients 10 & 11 into the base material (ingredients 1-9) and allow an induction period of 15 minutes before applying this liquified paint to the substrate.

| Ingredient | Percents by Weight | | | |
| --- | --- | --- | --- | --- |
| | A | B | C | D |
| 1. Epoxy Resin (Epon 1513) | 16.6 | 22.1 | 14.2 | 17.3 |
| 2. Propylene Glycol Monomethyl Ether | 25.7 | 26.9 | 24.3 | 26.4 |
| 3. Surfactant (Byk 320) | 0.1 | 0.1 | 0.1 | 0.1 |
| 4. Surfactant (Anti-Terra 204) | 0.1 | 0.1 | 0.1 | 0.1 |
| 5. Titanium Dioxide, TiO$_2$ (R-960) | 8.1 | 0.9 | 11.9 | 10.9 |
| 6. TiO$_2$ Vesiculated Beads | 0.4 | 0.8 | 0.4 | 1.1 |
| 7. Zinc-Barium Phosphate (J0866) | 19.4 | 18.2 | 18.4 | 18.2 |
| 8. Zinc Benzoate (Sicorin RZ) | 1.9 | 1.8 | 1.8 | 1.8 |
| 9. Calcium Borosilicate (CW-291) | 13.9 | 9.6 | 16.8 | 10.0 |
| 10. Polyamide Resin (Versamid 1540) | 9.2 | 12.2 | 7.8 | 9.5 |
| 11. Isopropanol | 4.4 | 7.3 | 4.2 | 4.5 |

Versamid-1540 is a polyamide resin derived from dimeracids and polyamines which can be obtained from the Henkel Corporation of Kankakee, Ill. Versamid-1540 is a solid free polyamide resin which is particularly useful in combination with epoxy resins to form high solid coatings which are weather resistance, have excellant light stability and color retention. The Versamid resins may be used in combination with epoxy resins in amounts ranging up to about 60 percent by weight of the total used in formulating the coating composition. Versamids have amine values ranging from 370 to 400, are substantially clear in color, a viscosity at 40° C., poise of 25 to 40, and a specific gravity at 25° C. of 1.03.

The epoxy resins and specifically EPON-1513 is derived from the reaction of epichlorohydrin and an alcohol such as a substituted dicyclohexanol. The coatings prepared in accordance with this invention comprising a combination of an epoxy resin and polyamide resin together with a combination of pigments as disclosed herein. These coatings were subjected to corrosion resistance test and found to be resistant to corrosion for periods ranging up to 500 hours in a SO$_2$-Salt Fog Test and up to 1,000 hours in the Salt Fog Test.

The coating is applied on the substrate at thickness ranging from about 0.001 to 0.003 inches e.g. up to about 5 mils preferably 1 to 3 mils. The coating may be applied by various methods including spraying, rolling, or brushing onto the surface depending on the viscosity of the coating. The viscosity of the coating for a particular application may be achieved by adjusting the molecular weights of the resins and the content of the solvent within the ranges specified herein and the selection of the particular epoxide. After the coating is applied to the surface, the solvent is evaporated at room or elevated temperatures and cured to a film having the desired properties. The pigments can be introduced into the coating by first forming a base with the epoxy binder. The base can be formed, for example, by conventional sand-grinding or ball-milling techniques, and then blended, by simple stirring or agitation, with the other constituents of the composition.

It was unexpected that the specific combination of calcium borosilicate, zinc salt of a benzoic acid, e.g. zinc benzoate and an alkaline earth metal phosphate e.g. zinc or zinc-barium phosphate would improve the corrosion resistance of the coating. The specific combination of calcium borosilicate, a zinc salt of a substituted benzoic acid and a zinc or zinc-barium phosphate, in the percentages stated, improved the corrosion inhibition of the coating substantially when compared to the use of either one of these pigments alone in the same coating.

For purposes of this invention, the term epoxy resins can be any resin or a mixture thereof having two or more epoxy groups and combinations of epoxy resins with other resins such as the modified-urethanes, polyamides and the like. The most common are produced by the reaction of an epoxide with polyhydric phenols or alcohols to produce the polyglycidyl ethers. Resins of this type include the diglycidyl ethers of bisphenol-A; glycidyl ethers of glycerol and glycidyl ethers of long-chain bisphenols. These epoxy resins are commercially available under such tradenames as Araldite, by Ciba Company, Inc. and Epon, by Shell Chemical Company. Some commercial resins are derived from the reaction of phenols with epihalohydrins and particularly epichlorohydrin. These resins have molecular weights in the range of 300-10,000. Some of these resins are disclosed in U.S. Pat. Nos. 2,467,171; 2,581,464; 2,582,985 and 2,615,007, the disclosures of which are incorporated herein by reference. Included are the cyclic and aliphatic epoxy resins which do not contain the phenolic structure associated with the more conventional epoxy resins.

More specifically, the epoxy resins and the modified epoxy resins including mixtures thereof may be defined as containing at least two epoxy groups where the groups are terminal or internal. The polyglycidyl compounds, for example, contain a plurality of 1-2 epoxide groups derived from the reaction of a polyfunctional active hydrogen containing compound with an excess of an epihalohydrin. When the active hydrogen compound is a polyhydric alchohol or phenol, the resulting epoxide contains glycidyl ether groups. The preferred polyglycidyl compounds are derived by the condensation of 2,2-bis(4-hydroxyphenyl)propane, i.e. bisphenol-A. Specific bisphenol-A epoxy resins are available commercially under trade names such as "EPON 1513", "EPON 828", "EPON 1001", and "EPON 1009" from Shell Chemical Co., and as "DER 330", DER 331", and "DER 332" from Dow Chemical Co.

Other suitable polyepoxides can be prepared from polyols such a pentaerythritol, glycerol, butanediol or trimethylol propane and an epihalohydrin. In a preferred embodiment, the organic binder comprise an epoxy resin derived from the condensation of bisphenol-A and epichlorohydrin. These epoxy resins include, for example, the bisphenol-A epichlorohydrin condensation products which have average molecular weights ranging from about 1,000 to 500,000. These resins include the polyol-epoxy resins comprising alkylene oxides; the polyolefin epoxy resins comprising epoxypolybutadiene; the epoxy polyester resins comprising units of epoxyacrylates; the epoxyurethane resins comprising urethane groups and the polyhydroxypolyether, polyhydroxypolyether-ester or polyhydroxypolyester epoxy resins derived from the glycidyl etherified or glycidyl esterified polyvalent carboxylic acids.

The urethane-modified epoxy resins may have average molecular weights ranging from 1,000 to 20,000, while the polyol epoxy resins have average molecular weights of 6,000 to 60,000. These resins are prepared from epichlorohydrin, bisphenol-A and dibasic acids. Specific epoxy resins include the epoxypolyester, polyhydroxypolyether, polyhydroxypolyetherester and polyhydroxypolyester epoxy resins. These resins may be used alone or with other resins such as the phenolic resins, melamine resins or urethane resins to improve the various characteristics of the coating. The urethane-modified epoxide resins, for example, exhibit comparatively strong adhesion.

In general, the epoxy resins are in solution at concentrations of 20 to 60% by weight. Various solvents may be used in preparing the coating including xylene, toluene, mineral terpenes, methyl ethyl ketone, methyl isobutyl ketone, ethyl cellosolve, butyl cellosolve, cellosolve acetate, ethyl acetate, butyl acetate, methyl isobutyl carbinol, isopropanol, n-butanol, cyclohexanone or mixtures thereof with various paint solvents in any proportion. Usually, the content of the non-volatile components i.e. solvents in the coating composition of this invention ranges from about 0 to 75% e.g., 5–50% by weight of the total composition. The amount of solvent may vary depending on the viscosity and method of application of the coating onto the substrate.

A specific binder for the coating compositions comprises epoxy resins characterized by the presence of at least two epoxy groups, in combination with a curing agent. Preferably, the epoxy resin is obtained from the reaction of epichlorohydrin and a polyol. These epoxy resins are normally liquids or have a low molecular weight and are soluable in various aliphatic solvents such as ketones, esters, ether alcohols or any of the aromatic solvents such as xylene, etc. The second component of the epoxy binder is the amine curing agent for the epoxide. Amine curing agents include the aliphatic and aromatic amines, and in particular the tertiary amines, $C_2$–$C_{30}$, preferably $C_2$–$C_{10}$ polyamines, polyamides, and amine adducts. The preferred curing agents are the $C_2$–$C_{10}$ polyamines that contain two or more reactive hydrogen groups and amine-terminated polyamide compositions, including those formed through the condensation of unsaturated fatty acids with $C_2$–$C_{10}$ aliphatic polyamines having at least three amino groups per molecule. Examples of amine curing agents include triethylene tetramine, m-phenylenediamine, 3-diethylamino-1-propylamine, Versamid 100, 115, 125 and 1540 resins, ethylene diamine, m-xylylene diamine, 3,3'-iminobispropylamine, tetraethylene pentamine, etc. Sufficient amounts of the amine curing agent are employed to assure substantial crosslinking of the epoxide resin. Generally stoichiometric amounts or slight excess of the amine curing agent are employed. Amine curing agents are normally used in amounts varying from 5 to 75 percent by weight based on the type of epoxy resin.

The coating composition can optionally contain ultraviolet light stabilizers, antioxidants, catalysts, wetting or dispersing agents e.g. Anti-Terra-204 (carboxylic acid salts of polyamine amides), flow modifiers e.g. BYK-320 (polyether modified methylalkyl polysiloxane copolymer), adhesion promoters, etc. The ultraviolet light stabilizer can be present in an amount of 1–10% by weight, based on the weight of the binder. The antioxidant can be present in an amount of 0.1–3% by weight, based on the weight of the binder. Ultraviolet light stabilizers include benzophenones, triazoles, triazines, benzoates, substituted benzenes, organophosphorous sulfides, etc. Particularly useful are the hindered amines and other compounds disclosed in U.S. Pat. No. 4,061,616.

The coating composition of this invention can be applied to a variety of substrates by conventional application methods such a spraying, dipping, brushing, or flow coating. Substrates that can be coated with the composition are, for example, metal, wood, glass, or plastics such as polypropylene, polystyrene, and the like. The coating is particularly suited for application over pretreated or unprimed metal.

In forming the coating, the hydrocarbon solvents may include a mixture of solvents e.g. benzene, toluene, xylene, and aromatic naphtha. Ester solvents include ethyl acetate, butyl acetate, cellosolve, hexyl acetate, amyl acetate, ethyl proprionate, butyl proprionate, etc. Ketone solvents include acetone, methyl ethyl ketone, methyl isopropyl ketone, methyl isobutyl ketone, diethyl ketone, and cyclohexanone. Glycol ester solvents include ethylene glycol, monoethyl ether acetate, etc.

The particular alkaline earth metal or zinc phosphates used as one of the pigments in preparing the coating composition has an average particle size of about 7.0 microns and is preferably a zinc-barium phosphate. The preferred zinc salt of benzoic acid is specifically characterized as having at least one hydroxyl group and nitro ($NO_2$) substituent with molecular weights of about 100–500, a density of about 2–3 grams per mililiter and a specific surface area of $16M^2$/gram. The benzoic acid salt is a commercial product obtained from BASF and identified as Sicorin-RZ. The calcium borosilicate is a white, non-refractive pigment with an average particle size of about 3.4 microns.

In testing the coatings prepared in accordance with this invention, the corrosion protection for an aluminum substrate was found to be over 1,000 hours in 5% salt spray in accordance with ASTM Test Method B-117 and over 500 hours in $SO_2$/salt spray in accordance with ASTM Test Method G-85. The coating was found to have outstanding performance when exposed to extreme heat conditions, high intensity of light and water, extreme cold conditions, hot lubricating oils and other chemicals normally found in aircraft operations. By utilizing the coating composition of this invention, a corrosion resistant film can be obtained on various substrates. The coating therefore has properties which function as a primer and more important as a single top coat which is highly adherent, flexible, chemical resistant and resistant to all weather conditions. The coatings of this invention lowers the risk of failure due to cracking especially at low temperatures and are easily touched-up since only one coating need be applied. Since the coating requires only one coat, it requires less time for application and removal and thereby saves on manpower that would generally be needed in the preparation of a multi-coat system. Moreover, the present coating provides protection at lower film thicknesses thereby reducing the weight of the coating compared to a multi-coat paint system which is an important factor when considering aircraft coatings.

It is obvious that there are other variations and modifications which can be made with respect to this invention without departing from the spirit and scope of the invention as particularly set forth in the appendant claims.

We claim:

1. A corrosion-resistant self-priming coating comprising about 10 to 90 percent by weight of an epoxy resin and 5 to 65 percent by weight of a combination of corrosion-inhibiting pigments consisting essentially of about:
   15 to 35 percent by weight of an alkaline earth metal phosphate, 1 to 5 percent by weight of a zinc benzoate, 5 to 35 percent by weight of calcium borosilicate,
   0 to 30 percent by weight of titanium dioxide,
   and 0 to 75 percent by weight of at least one organic solvent.

2. The coating of claim 1 wherein the epoxy resin ranges from about 30 to 60 percent by weight, titanium dioxide ranges from about 1 to 20 percent by weight, alkaline earth metal phosphate ranges from about 20 to 30 percent by weight, zinc benzoate ranges from about 2 to 4 percent by weight, calcium borosilicate ranges from about 10 to 30 percent by weight and the solvent ranges from about 5 to 50 percent by weight.

3. The coating of claim 1 wherein 0 to 90 percent by weight of the total amount of titanium dioxide is in the form of vesiculated beads.

4. The coating of claim 2 wherein 0 to 90 percent by weight of the total amount of titanium dioxide is in the form of vesiculated beads.

5. The coating of claim 1 wherein the zinc benzoate is a salt of a substituted benzoic acid having a hydroxyl group and a nitro group.

6. The coating of claim 1 wherein the metal phosphate is a zinc-barium phosphate.

7. The coating of claim 1 wherein the metal phosphate is zinc phosphate.

8. A process of preparing a corrosion-resistant self-priming epoxy coating on a substrate which comprises forming the coating by applying onto the substrate an organic solution comprising from about 10 to 90 percent by weight of an epoxy resin and 5 to 65 percent by weight of a combination of corrosion-inhibiting pigments consisting essentially of about
   15 to 35 percent by weight of an alkaline-earth metal phosphate, 1 to 5 percent by weight of a zinc benzoate, 5 to 35 percent by weight of calcium borosilicate,
   0 to 30 percent by weight of a titanium dioxide pigment,
   and 0 to 75 percent by weight of at least one organic solvent.

9. The process of claim 8 wherein the metal phosphate is a zinc-barium phosphate and the epoxy resin is a modified-epoxy resin.

10. The process of claim 8 wherein the modified-epoxy resin is an (poly)amide-modified epoxy resin.

* * * * *